(12) United States Patent
Urac et al.

(10) Patent No.: US 10,690,146 B2
(45) Date of Patent: Jun. 23, 2020

(54) TURBOFAN NACELLE ASSEMBLY WITH FLOW DISRUPTOR

(71) Applicant: PRATT & WHITNEY CANADA CORP., Longueuil (CA)

(72) Inventors: Tibor Urac, Mississauga (CA); Peter Townsend, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 476 days.

(21) Appl. No.: 15/399,343

(22) Filed: Jan. 5, 2017

(65) Prior Publication Data

US 2018/0187697 A1    Jul. 5, 2018

(51) Int. Cl.
  *F04D 29/54* (2006.01)
  *F02C 7/04* (2006.01)
  *F01D 5/14* (2006.01)
  *F04D 27/00* (2006.01)
  *F01D 21/00* (2006.01)

(52) U.S. Cl.
  CPC ......... *F04D 29/541* (2013.01); *F01D 5/143* (2013.01); *F01D 5/146* (2013.01); *F02C 7/04* (2013.01); *F01D 5/141* (2013.01); *F01D 5/142* (2013.01); *F01D 5/145* (2013.01); *F01D 21/003* (2013.01); *F04D 27/001* (2013.01); *F04D 29/542* (2013.01); *F04D 29/544* (2013.01); *F05D 2220/36* (2013.01); *F05D 2240/122* (2013.01); *F05D 2240/127* (2013.01); *F05D 2250/182* (2013.01); *F05D 2250/184* (2013.01); *F05D 2260/83* (2013.01); *F05D 2270/80* (2013.01)

(58) Field of Classification Search
  CPC . F02C 7/04; F01D 5/146; F01D 5/143; F01D 5/141; F01D 5/142; F01D 5/145; F05D 2250/184; F05D 2220/36; F05D 2240/127; F05D 2240/122; F05D 2250/182; F04D 29/542; F04D 29/544; F02K 3/06
  See application file for complete search history.

(56) References Cited

U.S. PATENT DOCUMENTS

| 3,333,794 A | 8/1967 | Manns |
| 3,610,262 A | 10/1971 | Wise et al. |
| 3,819,008 A | 6/1974 | Evans et al. |
| 3,937,590 A | 2/1976 | Mani |

(Continued)

FOREIGN PATENT DOCUMENTS

| CN | 101922312 | 12/2010 |
| DE | 102012003902 | 6/2013 |

(Continued)

*Primary Examiner* — Patrick Hamo
*Assistant Examiner* — David N Brandt
(74) *Attorney, Agent, or Firm* — Norton Rose Fulbright Canada LLP

(57) ABSTRACT

A turbofan engine is disclosed which includes a nacelle assembly, having an interior surface for directing airflow, and a flow disruptor positioned on the interior surface upstream of the fan, the flow disruptor extending towards the axis a height greater than the anticipated boundary layer height of the airflow. A turbofan engine which includes an array of circumferentially disposed flow disruptors extending from a fan case inner surface is also disclosed. A method of mitigating fan flutter in a gas turbine engine by generating a circumferential asymmetrically in the airflow, upstream of the fan, is also described.

16 Claims, 6 Drawing Sheets

(56) References Cited

U.S. PATENT DOCUMENTS

| | | |
|---|---|---|
| 4,076,454 A | 2/1978 | Wennerstrom |
| 4,104,002 A | 8/1978 | Ehrich |
| 4,254,619 A | 3/1981 | Giffin et al. |
| 4,354,346 A | 10/1982 | Wooding |
| 4,354,804 A | 10/1982 | Cruzen |
| 4,844,692 A | 7/1989 | Minkkinen et al. |
| 5,275,531 A | 1/1994 | Roberts |
| 5,365,731 A | 11/1994 | Nikkanen et al. |
| 5,474,417 A | 12/1995 | Privett et al. |
| 5,489,186 A | 2/1996 | Yapp et al. |
| 5,607,284 A | 3/1997 | Byrne et al. |
| 5,628,622 A | 5/1997 | Thore et al. |
| 5,762,470 A | 6/1998 | Gelmedov et al. |
| 6,139,259 A | 10/2000 | Ho et al. |
| 6,179,551 B1 | 1/2001 | Sathianathan et al. |
| 6,227,794 B1 | 5/2001 | Wojtyczka et al. |
| 6,508,624 B2 | 1/2003 | Nadeau et al. |
| 6,514,039 B1 | 2/2003 | Hand |
| 6,540,478 B2 | 4/2003 | Fiala et al. |
| 6,655,632 B1 | 12/2003 | Gupta et al. |
| 7,118,331 B2 | 10/2006 | Shahpar |
| 7,444,802 B2 | 11/2008 | Parry |
| 7,665,964 B2 | 2/2010 | Taylor et al. |
| 76,655,964 | 2/2010 | Taylor et al. |
| 7,797,944 B2 * | 9/2010 | Morford ............... F02K 1/06 239/265.39 |
| 7,861,823 B2 | 1/2011 | Prasad et al. |
| 7,914,251 B2 | 3/2011 | Pool et al. |
| 8,046,915 B2 | 11/2011 | Xie et al. |
| 8,186,942 B2 | 5/2012 | Haas |
| 81,896,942 | 5/2012 | Haas |
| 8,366,047 B2 | 2/2013 | Euvino, Jr. et al. |
| 8,403,624 B2 | 3/2013 | Xie et al. |
| 8,461,713 B2 | 6/2013 | Sammy |
| 8,540,490 B2 | 9/2013 | Ramakrishnan et al. |
| 8,636,464 B2 | 1/2014 | Bottome |
| 8,756,909 B2 | 6/2014 | Avery |
| 9,091,174 B2 | 7/2015 | Bagnall |
| 2011/0164967 A1 | 7/2011 | Elorza Gomez et al. |
| 2012/0087787 A1 | 4/2012 | Brown |
| 2012/0240594 A1 | 9/2012 | Shamara |
| 2012/0263587 A1 | 10/2012 | Hergt et al. |
| 2013/0045370 A1 | 2/2013 | Aho et al. |
| 2013/0153456 A1 | 6/2013 | Zhu et al. |
| 2013/0202424 A1 | 8/2013 | Lussier et al. |
| 2013/0266439 A1 * | 10/2013 | Rubak .................. F01D 1/04 415/208.1 |
| 2014/0010638 A1 | 1/2014 | Perrot |
| 2014/0030071 A1 | 1/2014 | Leslie et al. |
| 2014/0219792 A1 | 8/2014 | Topol et al. |
| 2014/0286768 A1 | 9/2014 | Boniface et al. |
| 2015/0260051 A1 | 9/2015 | Gallagher et al. |
| 2016/0084162 A1 | 3/2016 | Abrari et al. |
| 2016/0084265 A1 * | 3/2016 | Yu ..................... F04D 29/542 |
| 2016/0844162 | 3/2016 | Abrari et al. |
| 2016/0186690 A1 * | 6/2016 | Florea ................. F01D 5/143 60/226.1 |
| 2016/0312618 A1 | 10/2016 | Macchia |
| 2016/0312641 A1 | 10/2016 | Macchia |
| 2017/0145840 A1 | 5/2017 | Di Mare et al. |
| 2017/0145959 A1 | 5/2017 | Baralon |
| 2017/0147741 A1 | 5/2017 | Di Mare et al. |
| 2017/0152861 A1 | 6/2017 | Japikse |
| 2017/0248156 A1 | 8/2017 | Parker et al. |
| 2018/0156235 A1 | 6/2018 | Li et al. |

FOREIGN PATENT DOCUMENTS

| | | |
|---|---|---|
| EP | 1956247 | 8/2008 |
| GB | 623142 | 5/1949 |
| GB | 2405184 | 2/2005 |
| JP | 2000095195 | 4/2000 |
| WO | 9809066 | 3/1998 |
| WO | 02/29224 | 4/2002 |
| WO | 20140023891 | 2/2014 |

* cited by examiner

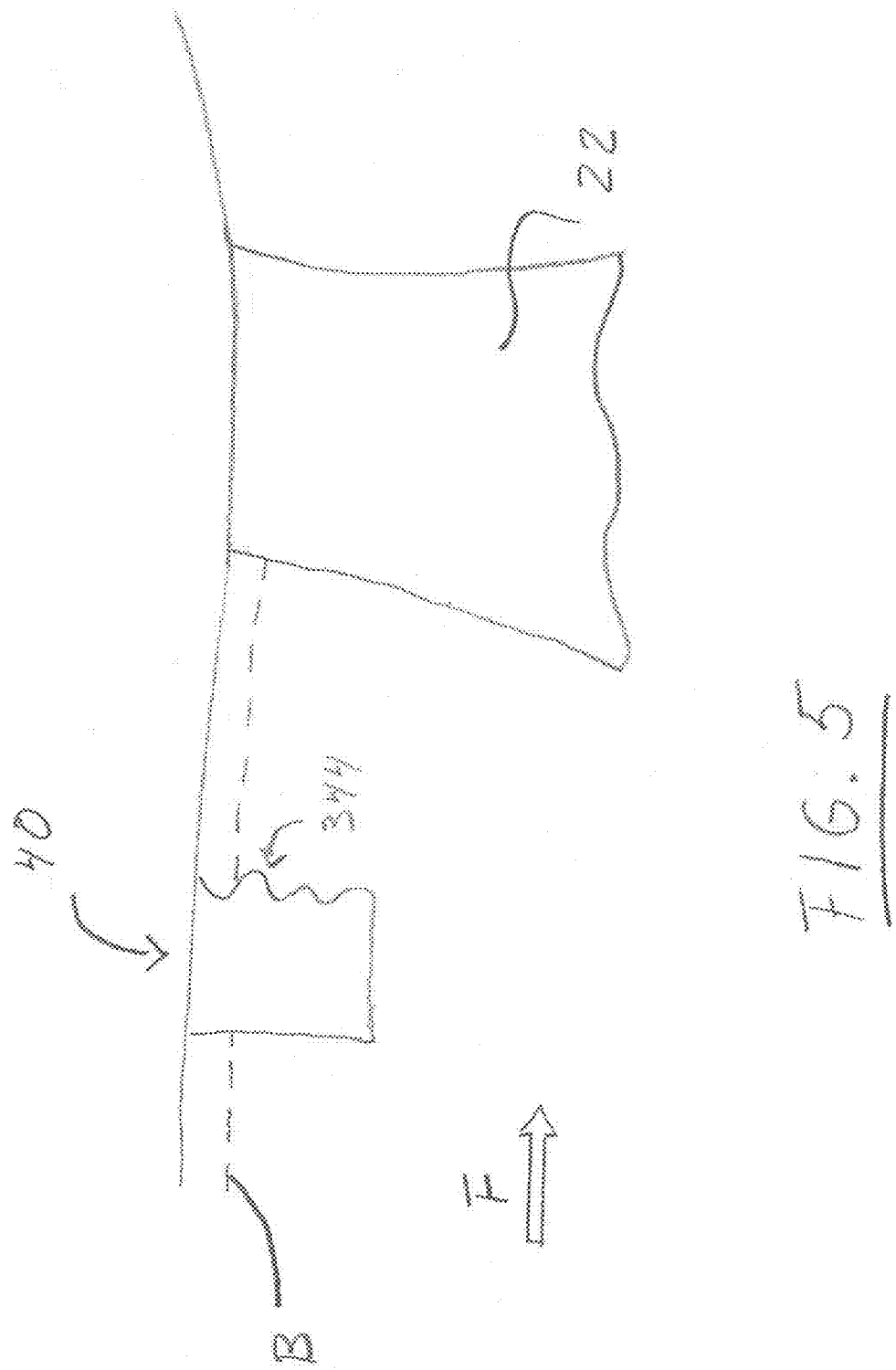

TURBOFAN NACELLE ASSEMBLY WITH FLOW DISRUPTOR

TECHNICAL FIELD

The application relates generally to fans of gas turbine engines and, more particularly, to mitigating fan flutter.

BACKGROUND

Fan flutter is a type of aerodynamic instability that occurs in a gas turbine engine fan when two or more adjacent fan blades vibrate at a frequency close to their natural frequency and the interaction between adjacent blades maintains and/or strengthens such vibration. Prolonged operation of a fan undergoing fan flutter can produce a potentially undesirable result caused by airfoil stress load levels exceeding threshold values. It is known in the field of gas turbine engine to mechanically mistune adjacent blades so as to separate their natural frequencies. Such a solution to fan flutter introduces however a level of manufacturing complexity that is not always desirable.

There is an ongoing need for mitigating fan flutter in a gas turbine engine fan.

SUMMARY

In one aspect, there is provided a turbofan engine, comprising a nacelle assembly extending along an axis to a fan and having an interior surface for directing airflow to the fan in use, the airflow having an anticipated boundary layer height above the interior surface; and a flow disruptor positioned on the interior surface upstream of the fan, the flow disruptor being disposed on a selected circumferential section of the interior surface and extending towards the axis a height greater than the anticipated boundary layer height.

In another aspect, there is provided a turbofan engine comprising a fan within a fan case, the case having a radially inner surface; and an array of circumferentially disposed flow disruptors extending from the radially inner surface upstream of the fan, the flow disruptors extend radially inwardly to a height that is greater than an anticipated boundary layer height of a gas turbine engine airflow, the flow disruptors disposed to occupy less than half of the radially inner surface's total circumference.

In a further aspect, there is provided, in a gas turbine engine with an annular gas path which directs airflow to a fan, a method of mitigating fan flutter, the method comprising introducing, upstream of the fan, a circumferential asymmetry in the airflow's radially outer portion.

Further details of these and other aspects of the subject matter of this application will be apparent from the detailed description and drawings included below.

BRIEF DESCRIPTION OF THE DRAWINGS

Reference is now made to the accompanying figures in which:

FIG. 5 is a schematic cross-sectional view of a flow disruptor disposed on a fan containment case upstream of a fan of a gas turbine engine pursuant to an embodiment of the invention;

DETAILED DESCRIPTION

Figure 1:
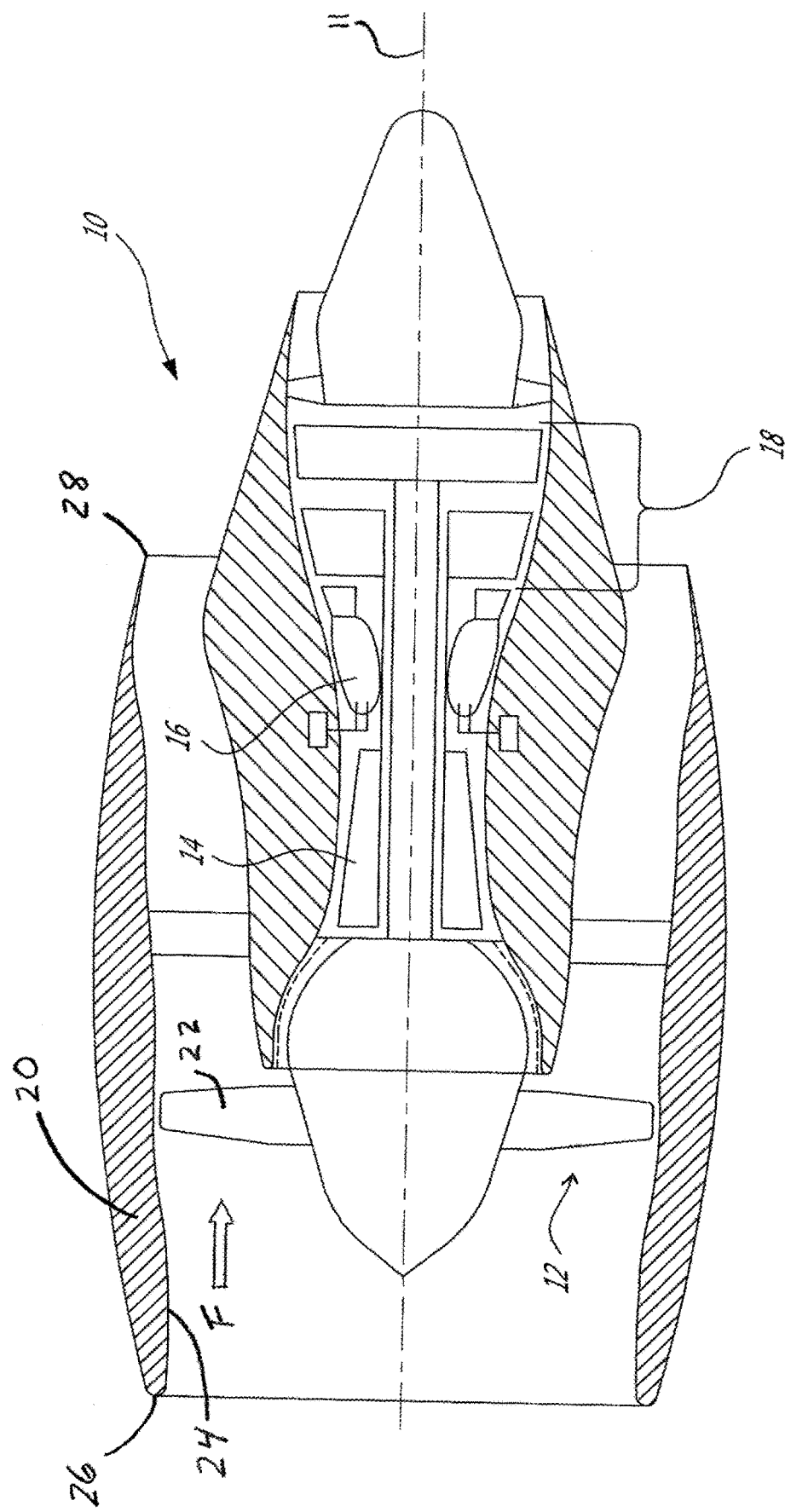
FIG. 1 is a schematic cross-sectional view of a gas turbine engine.

FIG. 1 illustrates a gas turbine engine 10 of a type preferably provided for use in subsonic flight, generally comprising in serial flow communication a propulsive fan 12 through which ambient air is propelled (whose direction is represented by arrow F), a compressor section 14 for pressurizing the air, a combustor 16 in which the compressed air is mixed with fuel and ignited for generating an annular stream of hot combustion gases, and a turbine section 18 for extracting energy from the combustion gases. The fan 12 comprises an array of circumferentially spaced blades 22 configured for rotation about a central longitudinal axis 11 of the engine 10. Engine 10 also comprises a nacelle 20 for containing various components of engine 10. Nacelle 20 has an annular interior surface 24, extending axially from an upstream end 26 (often referred to as the nose/inlet cowl) to a downstream end 28, for directing the ambient air.

As discussed above, fan flutter occurs because of the interaction between adjacent fan blades. It has however been found that vibrating adjacent blades extract energy from the airflow during operation, which energy continually maintains and/or strengthens the blades' vibration mode. It has therefore been found that, by disrupting this interaction (between adjacent blades and the airflow), more specifically by introducing a circumferential asymmetry in the airflow's radially outer portion, a damping effect is introduced into the system, thereby leading to a mitigation of fan flutter.

Figure 2:
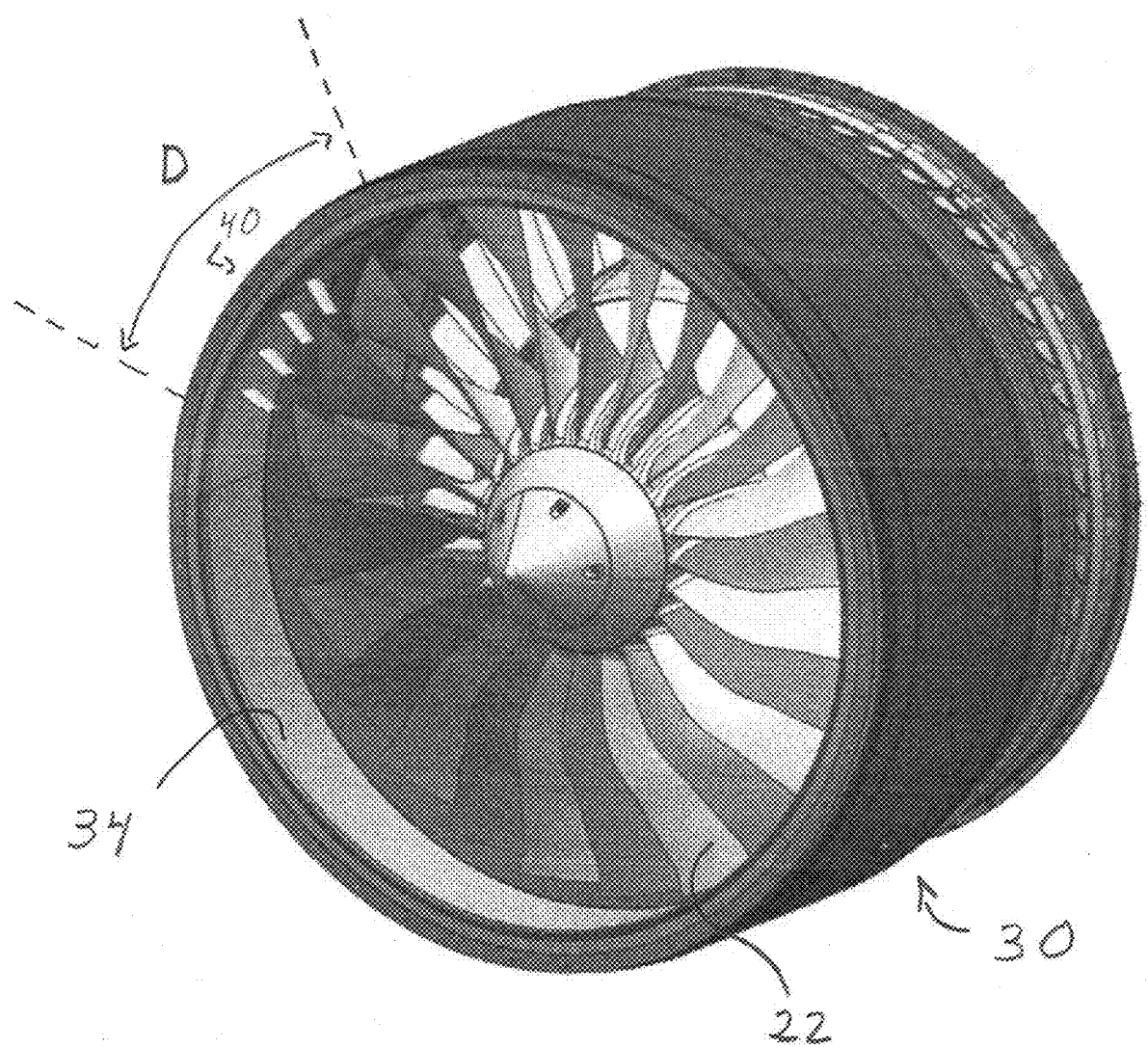
FIG. 2 is an isometric view of flow disruptors disposed on a fan containment case of a gas turbine engine pursuant to an embodiment of the invention.
Figure 3:
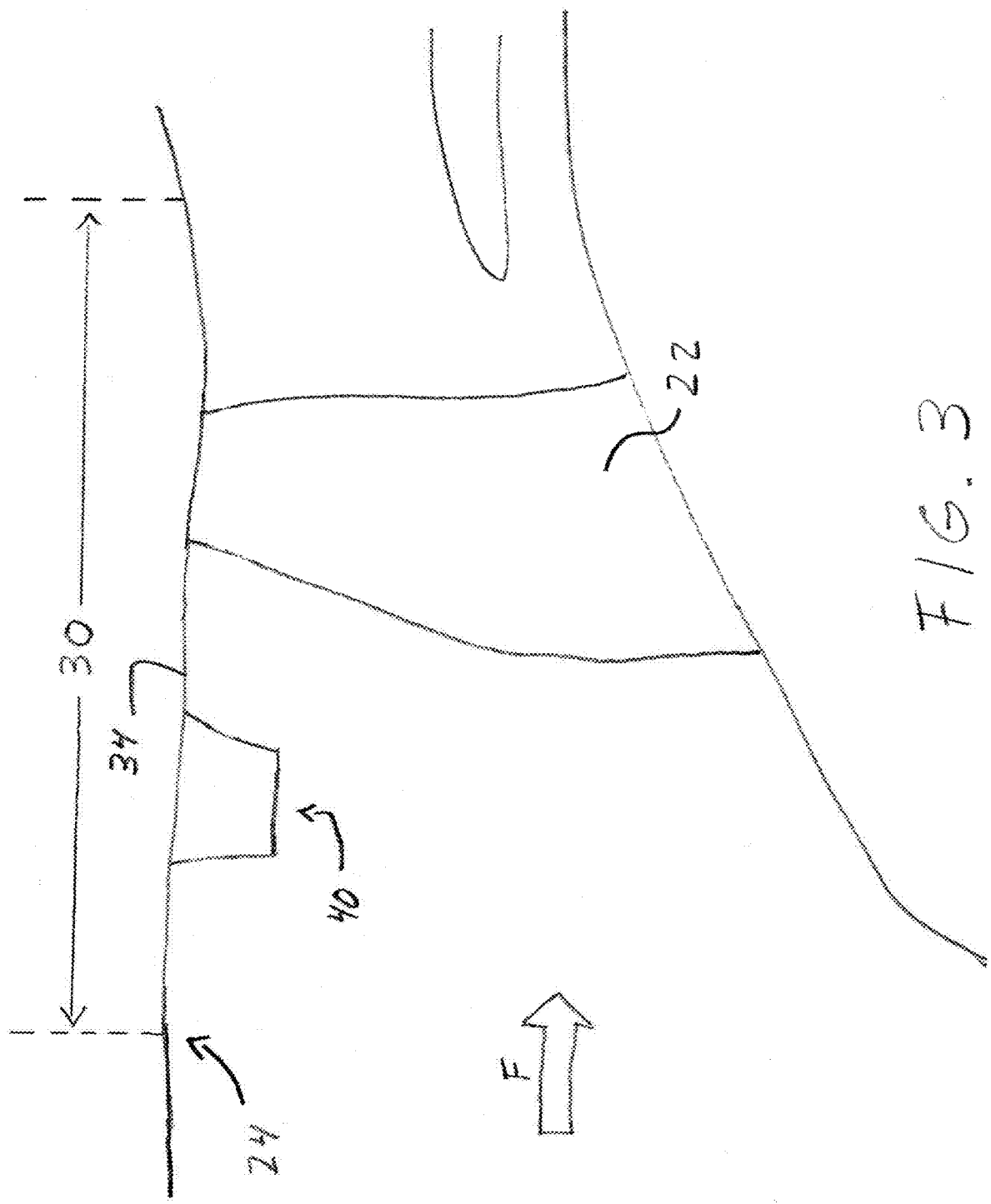
FIG. 3 is a schematic cross-sectional view of a flow disruptor disposed on a fan containment case upstream of a fan of a gas turbine engine pursuant to an embodiment of the invention.

The introduction of a circumferential asymmetry in the airflow's radially outer portion is effected by introducing a flow disruptor 40, on annular interior surface 24, upstream of fan 12. More specifically, as shown in FIGS. 2-3, flow disruptor 40 is disposed on portion of fan containment case 30 (also known as "fan case"), whose radially inner surface 34 acts as a portion of annular interior surface 24. Flow disruptor 40 extends radially inwardly from fan containment case 30 and is disposed upstream of fan blades 22 (contrary to what is shown in FIGS. 1-2, it should be noted that FIG. 3, as well as subsequent figures, do not show a clearance gap between fan blade 22 tip and annular interior surface 24—this is not meant to signify that no such clearance gap exist, but is meant to simplify the drawings). Furthermore, flow disruptor 40 is positioned in a portion of the fan containment case 30's full circumference, more specifically in selected circumferential section D. Although it is possible for selected circumferential section D to exceed 50% of full circumference of fan containment case 30, it is advantageous not to exceed such 50%. Indeed, the circumferential asymmetry in the airflow's radially outer portion generated by flow disruptor 40 occupying a percentage x % over such 50% limit is similar to the circumferential asymmetry in the airflow's radially outer portion generated by flow disruptor 40 occupying a percentage x % under such 50%; with increased costs and/or manufacturing complexities associated with flow disruptor 40 occupying a percentage x % over such 50% limit (vs where flow disruptor 40 occupies a percentage x % under such 50%), a limit of 50% of full circumference of fan containment case 30 is advantageous. Disruptor circumferential section D must however be less than full circumference of fan containment case 30 so that flow asymmetry is achieved.

Figure 4:
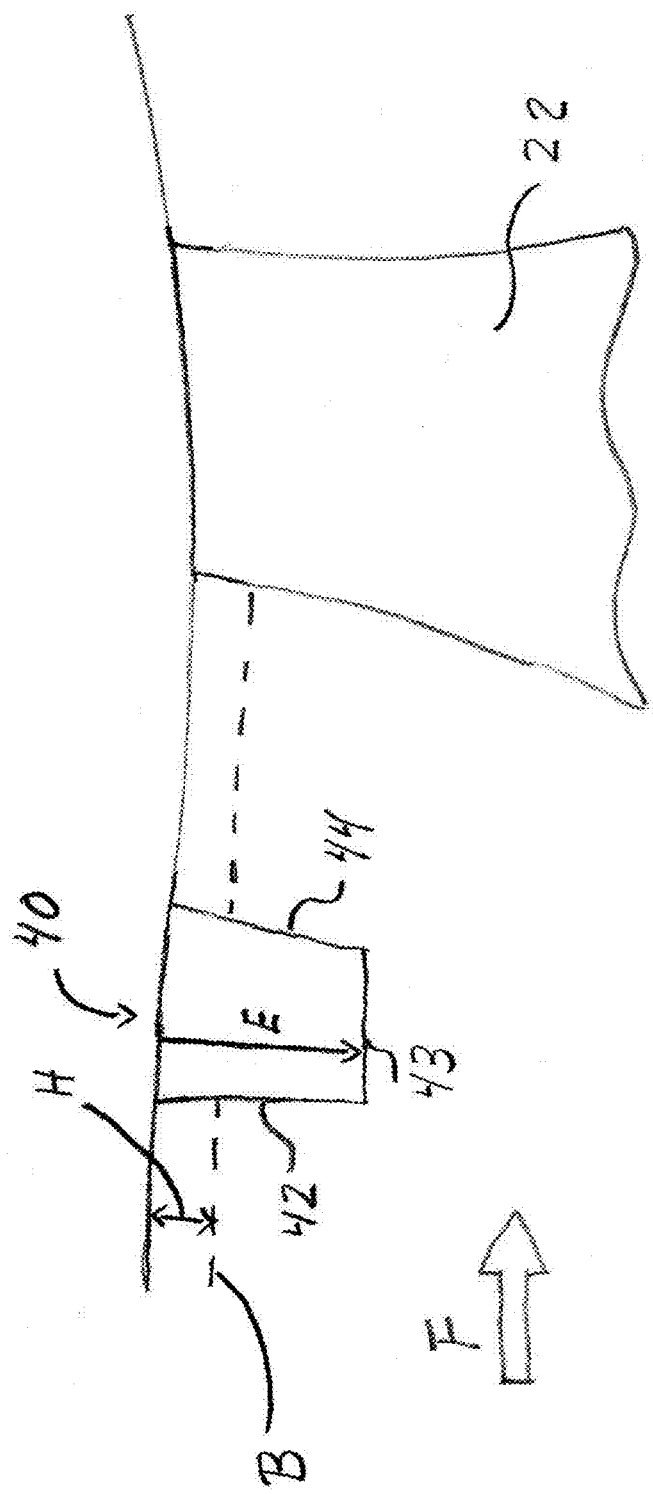
FIG. 4 is a schematic cross-sectional view of a flow disruptor disposed on a fan containment case upstream of a fan of a gas turbine engine pursuant to an embodiment of the invention.

As outlined above, flow disruptor 40 is to disrupt a segment of the radially outer portion of the airflow that is directed to fan 12. As shown in FIG. 4, this is accomplished by ensuring that flow disruptor 40 extends across the airflow boundary layer B; stated differently, radial inward extension E of flow disruptor 40 must be greater than anticipated boundary layer height H of the airflow. Having radial inward extension E of flow disruptor 40 being at least 2 times greater than anticipated boundary layer height H of the airflow is advantageous so as to sufficiently disrupt the air flow's motive portion, but any radial inward extension over boundary layer height H is possible pursuant to the invention. Also having radial inward extension E of flow disruptor 40 not exceeding 5 times anticipated boundary layer height H of the airflow is advantageous so as to minimize the efficiency penalties associated with the airflow disturbance, but, again, any radial inward extension over boundary layer height H is possible pursuant to the invention.

Flow disruptor 40 can take many forms pursuant to the invention. It can be a single component. It is however advantageous to spread the airflow disturbing function over a number of components. In the embodiment shown in FIG. 2, flow disruptor 40 is an array of components disposed in an arc within selected circumferential section D of fan containment case 30. It is however possible for such array of components not to be disposed in an arc, but instead be positioned at various non-aligned locations within selected circumferential section D.

In the embodiment shown in FIG. 2, flow disruptor 40, more specifically the array of components, is located in a single circumferential location (selected circumferential section D). It is however possible to have several circumferential sections D i.e. it is possible to have flow disruptor 40 positioned at several circumferential locations around fan containment case 30. As outlined above, the circumferential space occupied by the several circumferential sections D must be less than full circumference of fan containment case 30 and it would be advantageous for the circumferential space occupied by the several circumferential sections D not to exceed such 50% of the full circumference of fan containment case 30.

Also, whereas the embodiment shown in FIGS. 2-3 shows flow disruptor 40 being located on fan containment case 30, it is possible to have flow disruptor 40 disposed at other more upstream locations on annular interior surface 24, such as on a nose/inlet cowl.

Various shapes of flow disruptor 40 are possible to disrupt a segment of the radially outer portion of the airflow that is directed to fan 12. More specifically, with reference to FIG. 4, the shape of leading edge 42, trailing edge 44 and top surface 43 all contribute to flow disruptor 40's flow disruption purpose. In determining which shape is the most appropriate for a particular gas turbine engine, the fan flutter mitigating effect of flow disruptor 40 must be weighed against the efficiency penalty consequent on the presence of such flow disruptor 40.

Figure 6B:
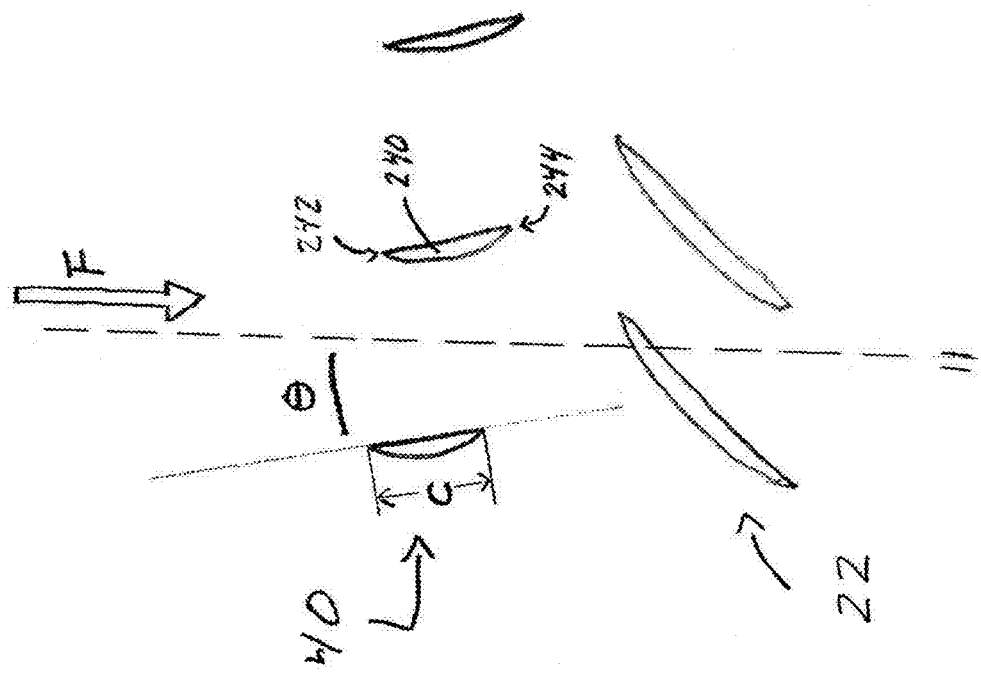
FIG. 6B is a top sectional view of flow disruptors disposed upstream of fan blades of a fan of a gas turbine engine pursuant to an embodiment of the invention.
Figure 6A:
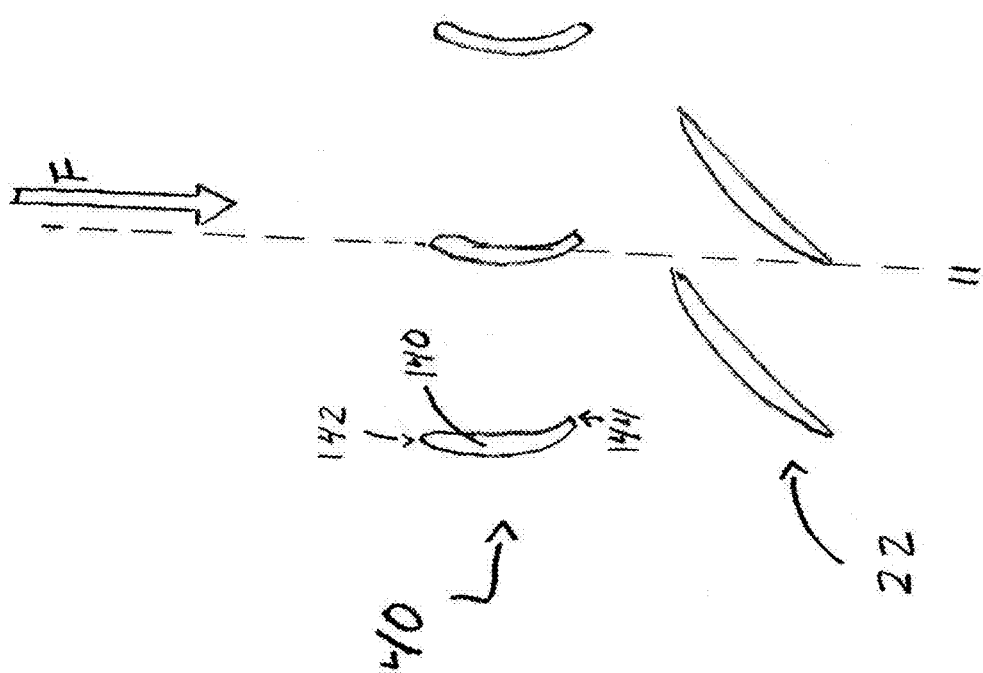
FIG. 6A is a top sectional view of flow disruptors disposed upstream of fan blades of a fan of a gas turbine engine pursuant to an embodiment of the invention.

One possibility is to have flow disruptor 40 shaped so as to introduce turbulence in an otherwise laminar airflow. These turbulators can take many forms. They can be shaped so as to be vortex generators: an example of such turbulators is shown in FIG. 6A, where airfoil-shaped vanes 140 comprise a profiled leading edge 142 and a trailing edge 144 with non-uniform features, more specifically a profile bent; alternatively, it is possible to have non linear trailing edges 344 (as shown in FIG. 5) which have sinusoidal-shaped trailing edge features or other forms of non-linear or non-uniform trailing edge features (such as chevron-shaped trailing edges), or any other feature in the turbulator profile that generates vortices downstream thereof. Turbulators can also be shaped so as to be flow separators: non airfoil-shaped vanes, such as tubular shaped protrusions, are possible in this respect; protruding engine parts, such as engine probes, can also be used to act as turbulators. For example, existing pressure/temperature probes, typically found on a nose/inlet cowl, can be used.

Another possibility is to have flow disruptor 40 shaped so as to change the airflow direction without significantly introducing turbulence in an otherwise laminar airflow. This airflow angle modifier can take many forms. As shown in FIG. 6B, flow disruptor 40 can be airfoil-shaped stator vanes 240 that change airflow incidence angle to fan blades 22. Airfoil-shaped stator vanes 240 have a stagger angle $\Theta$, which is defined as the angle between chord C (extending from leading edge 42, 142, 242 to trailing edge 44, 144, 244) and the direction of flow F, corresponding here to central longitudinal axis 11. The value of stagger angle $\Theta$ will depend on many factors, such as the number of stator vanes 240 and the extent of radial inward extension E of such vane; stagger angle $\Theta$ will however be significant enough in terms of flow disruption capacity but will not exceed a certain value where engine efficiency loss is too large.

The above description is meant to be exemplary only, and one skilled in the art will recognize that changes may be made to the embodiments described without departing from the scope of the invention disclosed. For example, flow disruptor 40 may be shaped and positioned so as to introduce both turbulence in the airflow and change the airflow direction by a certain angle. More broadly, flow disruptor 40 may be positioned adjacently upstream of any rotor of a gas turbine engine 10 requiring flutter mitigation, such as compress or rotors, and the above description is not meant to be limited to fan flutter. Still other modifications which fall within the scope of the present invention will be apparent to those skilled in the art, in light of a review of this disclosure, and such modifications are intended to fall within the appended claims.

The invention claimed is:

1. A turbofan engine, comprising:
a nacelle assembly extending along an axis to a fan and having an interior surface extending annularly about the axis and configured for directing airflow to the fan in use, the airflow having an anticipated boundary layer height spaced a distance away from the interior surface; and
a flow disruptor positioned on the interior surface upstream of the fan, the flow disruptor being disposed on the interior surface and extending towards the axis a height greater than the distance of the anticipated boundary layer height, —the flow disruptor disposed only within a partial circumferential distance on the interior surface and configured to generate circumferential asymmetry in the airflow entering the fan downstream of the flow disruptor to mitigate fan flutter, the partial circumferential distance being less than a total circumference of the interior surface at any axial point upstream of the fan.

2. The turbofan engine as defined in claim 1, wherein the partial circumferential distance is less than half of the total circumference.

3. The turbofan engine as defined in claim 2, wherein the flow disruptor is positioned on the interior surface of a fan case.

4. The turbofan engine as defined in claim 1, wherein the flow disruptor extends towards the axis a height at least twice the anticipated boundary layer height.

5. The turbofan engine as defined in claim 4, wherein the flow disruptor extends towards the axis a height not exceeding 5 times the anticipated boundary layer height.

6. The turbofan engine as defined in claim 1, wherein the flow disruptor comprises an airfoil-shaped vane with a non linear trailing edge.

7. The turbofan engine as defined in claim 1, wherein the flow disruptor comprises an airfoil-shaped vane with a stagger angle.

8. The turbofan engine as defined in claim 1, wherein the flow disruptor includes one or more arrays of turbulators the arrays of turbulators including a number of circumferentially spaced apart turbulators.

9. The turbofan engine as defined in claim 8, wherein the flow disruptor includes at least two arrays of tabulators.

10. The turbofan engine as defined in claim 9, wherein the at least two arrays of turbulators occupy less than half of a total circumference of the interior surface at any axial point upstream of the fan.

11. The turbofan engine as defined in claim 1, wherein the flow disruptor is an array of airflow angle modifiers disposed circumferentially within the selected circumferential section of the interior surface.

12. The turbofan engine as defined in claim 1, wherein the flow disruptor is an array of airflow angle modifiers disposed circumferentially within at least two selected circumferential sections of the interior surface.

13. The turbofan engine as defined in claim 12, wherein the at least two selected circumferential sections occupy less than half of the total circumference of the interior surface.

14. A turbofan engine comprising:
   a fan within a fan case, the case having a radially inner surface; and
   an array of circumferentially disposed flow disruptors extending from the radially inner surface upstream of the fan, the flow disruptors extend radially inwardly to a height that is greater than an anticipated boundary layer height of a gas turbine engine airflow, the flow disruptors disposed along a partial circumferential distance of the radially interior surface, the partial circumferential distance being less than half of a total circumference of the radially interior surface at any axial point upstream of the fan, and the flow disruptors configured to generate circumferential asymmetry in the gas turbine engine airflow entering the fan downstream of the flow disruptors to mitigate flutter of the fan.

15. The turbofan engine as defined in claim 14, wherein the flow disruptors extend away from the radially inner surface of the fan case a height at least twice the anticipated boundary layer height.

16. The turbofan engine as defined in claim 14, wherein the flow disruptors include at least two arrays of tabulators which collectively span a circumferential distance that is less than half of a total circumference of the radially inner surface at any axial point upstream of the fan.

* * * * *